US008543395B2

(12) United States Patent
Todic

(10) Patent No.: US 8,543,395 B2
(45) Date of Patent: Sep. 24, 2013

(54) METHODS AND SYSTEMS FOR PERFORMING SYNCHRONIZATION OF AUDIO WITH CORRESPONDING TEXTUAL TRANSCRIPTIONS AND DETERMINING CONFIDENCE VALUES OF THE SYNCHRONIZATION

(75) Inventor: Ognjen Todic, San Francisco, CA (US)

(73) Assignee: Shazam Entertainment Ltd., London (GB)

( * ) Notice: Subject to any disclaimer, the term of this patent is extended or adjusted under 35 U.S.C. 154(b) by 409 days.

(21) Appl. No.: 12/782,469

(22) Filed: May 18, 2010

(65) Prior Publication Data

US 2011/0288862 A1 Nov. 24, 2011

(51) Int. Cl.
*G10L 15/00* (2013.01)

(52) U.S. Cl.
USPC .................. 704/235; 704/9; 704/10; 704/257

(58) Field of Classification Search
USPC ........................................ 704/9, 10, 235, 257
See application file for complete search history.

(56) References Cited

U.S. PATENT DOCUMENTS

| | | | |
|---|---|---|---|
| 5,333,275 A | | 7/1994 | Wheatley et al. |
| 5,649,060 A | | 7/1997 | Ellozy et al. |
| 2002/0087569 A1* | | 7/2002 | Fischer et al. ................. 707/100 |
| 2004/0117180 A1* | | 6/2004 | Rajput et al. ................... 704/231 |
| 2006/0112812 A1 | | 6/2006 | Venkataraman et al. |
| 2006/0149558 A1* | | 7/2006 | Kahn et al. ..................... 704/278 |
| 2008/0097754 A1 | | 4/2008 | Goto et al. |
| 2008/0270138 A1 | | 10/2008 | Knight et al. |
| 2009/0119101 A1* | | 5/2009 | Griggs .......................... 704/235 |
| 2010/0255827 A1* | | 10/2010 | Jordan et al. ................ 455/414.1 |
| 2010/0299131 A1* | | 11/2010 | Lanham et al. .................... 704/2 |
| 2010/0332225 A1* | | 12/2010 | Arrowood et al. ............ 704/235 |
| 2011/0054910 A1 | | 3/2011 | Fujihara et al. |

FOREIGN PATENT DOCUMENTS

EP 0 398 574 11/1990

OTHER PUBLICATIONS

International Search Report and Written Opinion prepared by the European Patent Office in International Patent Application Serial No. PCT/US2011/036601, mailed on Aug. 10, 2011.
Kan et al., "LyricAlly: Automatic Synchronization of Textual Lyrics to Acoustic Music Signals", IEEE Transactions on Audio, Speech and Language Processing, vol. 16, No. 2, Feb. 2008, pp. 338-349.
Mesaros, "Automatic Alignment of Music Audio and Lyrics", Proc. of the 11th Int. Conference on Digital Audio Effects (DAFx-08), Espoo, Finland, Sep. 1-4, 2008, pp. DAFX-1-4.
Young et al., The HTK Book (for HTK Version 3.4), first published Dec. 1995.

(Continued)

*Primary Examiner* — Leonard Saint Cyr
(74) *Attorney, Agent, or Firm* — McDonnell Boehnen Hulbert & Berghoff LLP

(57) ABSTRACT

Methods and systems for performing audio synchronization with corresponding textual transcription and determining confidence values of the timing-synchronization are provided. Audio and a corresponding text (e.g., transcript) may be synchronized in a forward and reverse direction using speech recognition to output a time-annotated audio-lyrics synchronized data. Metrics can be computed to quantify and/ or qualify a confidence of the synchronization. Based on the metrics, example embodiments describe methods for enhancing an automated synchronization process to possibly adapted Hidden Markov Models (HMMs) to the synchronized audio for use during the speech recognition. Other examples describe methods for selecting an appropriate HMM for use.

27 Claims, 8 Drawing Sheets

(56) References Cited

OTHER PUBLICATIONS

Fujihara et al., "Three Techniques for Improving Automatic Synchronization Between Music and Lyrics: Fricative Detection, Filler, Model, and Novel Feature Vectors for Vocal Activity Detection", National Institute of Advanced Industrial Science and Technology, 2008, pp. 69-72.

Fujihara et al., "Automatic Synchronization Between Lyrics and Music CD Recordings based on Viterbi Alignment of Segragated Vocal Signals", Proceedings of the Eighth IEEE International Symposium on Multimedia, 2006.

A. Loscos, P. Cano, and J. Bonada, "Low-delay singing voice alignment to text," in Proceedings of the International Computer Music Conference (ICMC), 1999.

* cited by examiner

METHODS AND SYSTEMS FOR PERFORMING SYNCHRONIZATION OF AUDIO WITH CORRESPONDING TEXTUAL TRANSCRIPTIONS AND DETERMINING CONFIDENCE VALUES OF THE SYNCHRONIZATION

BACKGROUND

Speech recognition (sometimes referred to as automatic speech recognition (ASR) or computer speech recognition) converts spoken words to text. The term "voice recognition" is sometimes used to refer to speech recognition where a recognition system is trained to a particular speaker to attempt to specifically identify a person speaking based on their unique vocal sound.

Speech recognition systems are generally based on Hidden Markov Models (HMM), which are statistical models that output a sequence of symbols or quantities. A speech signal can be viewed as a piecewise stationary signal or a short-time stationary signal, such that in a short-time, speech could be approximated as a stationary process. Speech could thus be thought of as a Markov model for many stochastic processes.

The HMMs output a sequence of n-dimensional real-valued vectors for each stationary signal. The vectors include cepstral coefficients, which are obtained by taking a Fourier transform of a short time window of speech, de-correlating the transform, and taking the first (most significant) coefficients. The HMM may have a statistical distribution that gives a likelihood for each observed vector. Each word or each phoneme may have a different output distribution. An HMM for a sequence of words or phonemes is made by concatenating individual trained HMMs for the separate words and phonemes.

Decoding of speech (e.g., when an ASR is presented with a new utterance and computes a most likely source sentence) may be performed using a Viterbi decoder that determines an optimal sequence of text given the audio signal, expected grammar, and a set of HMMs that are trained on a large set of data.

SUMMARY

In one example aspect, a method of processing audio signals is provided. The method includes receiving an audio signal comprising vocal elements, and performing an alignment of the vocal elements with corresponding textual transcriptions of the vocal elements. The method further includes based on the alignment, determining timing boundary information associated with an elapsed amount of time for a duration of a portion of the vocal elements, and outputting a confidence metric indicating a level of certainty for the timing boundary information for the duration of the portion of the vocal elements.

In one embodiment, a forward alignment of the vocal elements processed in a forward direction with corresponding textual transcriptions of the vocal elements is performed, and a reverse alignment of the vocal elements processed in a reverse direction with corresponding reverse textual transcriptions of the vocal elements is performed. In addition, the method includes determining forward timing boundary information associated with an elapsed amount of time for a duration of a portion of the vocal elements processed in the forward direction, and determining reverse timing boundary information associated with an elapsed amount of time for a duration of the portion of the vocal elements processed in the reverse direction. In this embodiment, the confidence metric is output based on a comparison between the forward timing information and the reverse timing information, for example.

In another embodiment, the audio signal is a song comprising lyrics, and the method further includes synchronizing the corresponding textual transcriptions of the vocal elements with the audio signal, and outputting time-annotated synchronized lyrics that indicate timing information of lines of the lyrics in relation to the audio signal.

In another example aspect, a computer readable storage medium having stored therein instructions executable by a computing device to cause the computing device to perform functions is provided. The functions include receiving an audio signal comprising vocal elements, and performing an alignment of the vocal elements with corresponding textual transcriptions of the vocal elements. The functions also include based on the alignment, determining timing boundary information associated with an elapsed amount of time for a duration of a portion of the vocal elements, and outputting a confidence metric indicating a level of certainty for the timing boundary information for the duration of the portion of the vocal elements.

In still another example aspect, a system is provided that comprises a Hidden Markov Model (HMM) database that may include statistical modeling of phonemes in a multidimensional feature space (e.g. using Mel Frequency Cepstral Coefficients), an optional expected grammar that defines words that a speech decoder can recognize, a pronunciation dictionary database that maps words to the phonemes, and a speech decoder. The speech decoder receives an audio signal and accesses the HMM, expected grammars, and a dictionary to map vocal elements in the audio signal to words. The speech decoder further performs an alignment of the audio signal with corresponding textual transcriptions of the vocal elements, and determines timing boundary information associated with an elapsed amount of time for a duration of a portion of the vocal elements. The speech decoder further determines a confidence metric indicating a level of certainty for the timing boundary information for the duration of the portion of the vocal elements.

In one embodiment, the speech decoder synchronizes textual transcriptions of the vocal elements with the audio signal, and outputs time-annotated synchronized lyrics that indicate timing boundary information of lines of lyrics in relation to the audio signal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
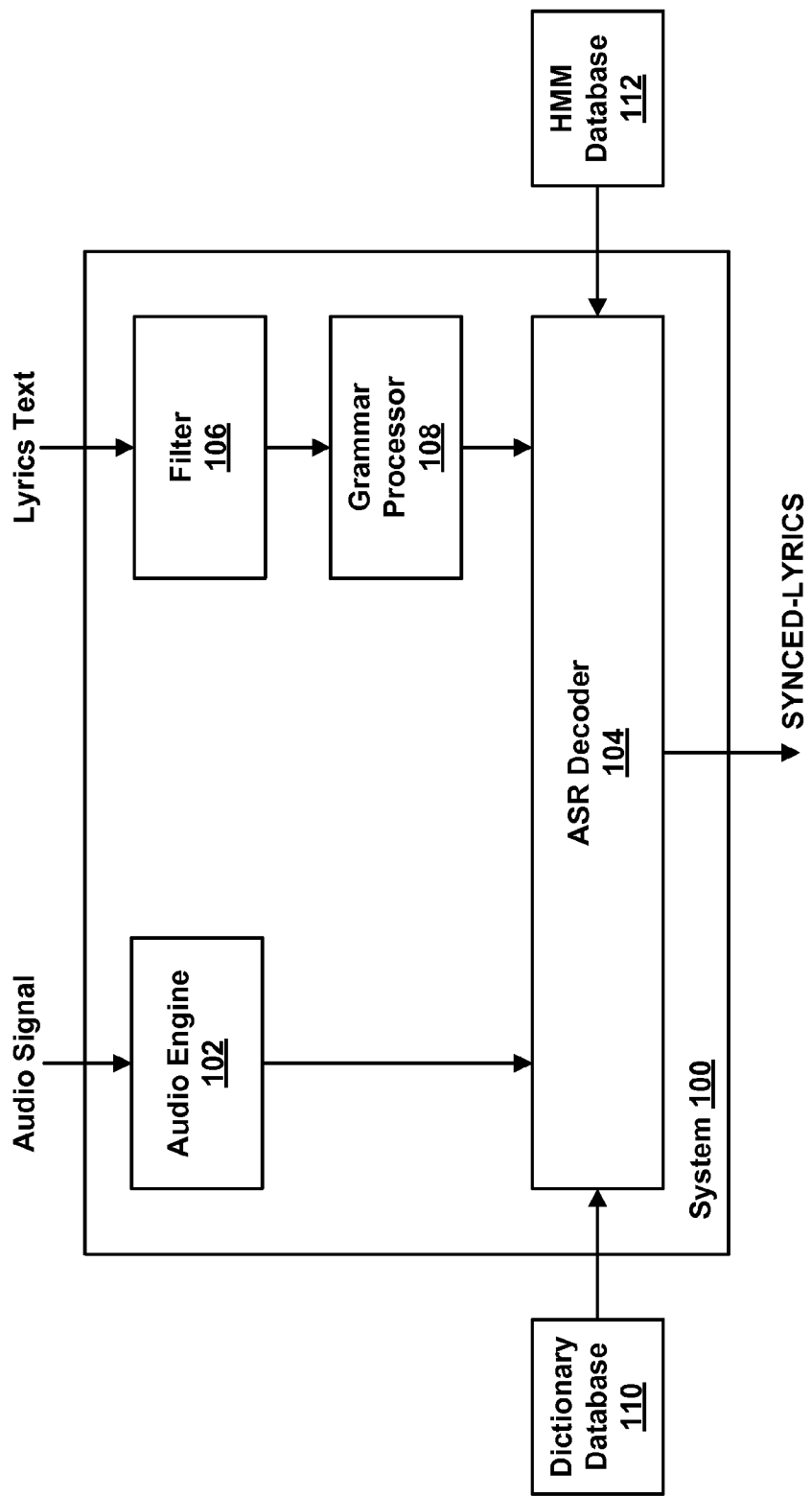
FIG. 1 shows an illustrative embodiment of a system for performing speech recognition and synchronizing text to the recognized speech.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In example embodiments, audio and a corresponding text (e.g., transcript) may be synchronized (using speech recognition techniques in some examples), and a resulting timing metadata may be used in many different applications, such as, for example, to enable a contextual search of audio, browsing of audio, as well as display of text as audio is being played (e.g., subtitles, karaoke-like display of lyrics, etc.).

Example embodiments describe methods for obtaining the timing metadata, computing confidence flags for the time-synchronization metadata, and enhancing an automated synchronization process using confidence information. For example, information obtained in an automated manner may not always be accurate due to a possible mismatch between input audio and acoustic models, as well as inaccuracies in a transcript, and thus, a confidence measure that describes a quality of timing information is generated to enhance a quality of inaccurate timing metadata using automated or manual methods.

FIG. 1 shows an illustrative embodiment of a system 100 for performing automated synchronization using speech recognition techniques. The system 100 receives an audio signal at an audio engine 102. The audio signal may include a speech, a song or musical data, a TV signal, etc., and thus, may include spoken or sung words and accompanying instrumental music or background noise. The audio engine 102 suppresses any instrumental music or background noise and outputs the spoken or sung words (e.g., vocals) to an automated speech recognition (ASR) decoder 104. When the input audio signal is a musical song, the spoken or sung words may correspond to lyrics of the song, for example.

The audio engine 102 may suppress any instrumental music in the audio signal using techniques that leverage the fact that vocals are usually centered in a stereo signal and instrumentals are not. Music (or other non-vocal data) can also be suppressed using frequency analysis methods to identify regions that are harmonically rich. As an example, the audio engine 102 may process the audio signal using the Vocal Remover product from iZotope, Inc. The audio engine 102 may suppress non-vocal data so as to extract the vocal data or data representing spoken utterances of words, for example.

The system 100 also receives a lyrics text file corresponding to the lyrics of the audio signal at a filter 106. The filter 106 cleans and normalizes the lyrics text. For example, the filter 106 may correct misspelling errors using lookup tables, modify vocalizations (e.g., words like 'heeeey', 'yeah', etc.) can be reduced to a smaller set (e.g. 'heeeey' and 'heeey' will be changed to 'heey'), perform grammatical changes capitalize first letter of each line), and remove extraneous non-lyrical text (e.g., name of the artist and the song, tags potentially identifying musical segments such as chorus or verse).

A grammar processor 108 receives the lyrics text from the filter 106, and creates "grammars" that indicate text that is expected to be in the vocals in the audio signal. The lyrics text can be transformed into a sequence of words accompanied by "words" modeling instrumental (music-only) portions of the signal inserted at the beginning and end. Optional instrumental and/or filler models can be inserted between words in the lyrics to account for voice rest and possible background accompaniment.

The ASR decoder 104 receives the vocals from the audio engine 102 and grammars from the grammar processor 108 and performs lyric synchronization. In an example where accurate lyrics are known ahead of time, the ASR decoder 104 will perform a forced-alignment of audio and lyrics, i.e., the expected response in the grammars will be mapped to corresponding words that are sung. Accurate lyrics may be determined based on a source of the lyrics text. If the lyrics text is received from a trusted source, then accurate lyrics can be assumed, and forced-alignment can be used to map the lyrics to the audio signal. Thus, using force alignment, grammars are defined so that there is no branching, i.e., only certain possible sequences of words can be recognized. Timing information can be stored for a beginning and ending time for each line of lyrics in relation to elapsed amount of time of the song, for example, by including a timestamp or counter (not shown) in the system 100 or as a function of the ASR decoder 104.

The ASR decoder 104 may have access to a pronunciation dictionary database 110 that defines phonetic representations of a word (e.g., phonemes). Although the dictionary database 110 is illustrated separate from the system 100, in other examples, the dictionary database 110 may be a component of the system 100 or may be contained within components of the system 100.

The filter 106 may clean the lyrics text and prepare the lyrics for the grammar processor 108. The grammar processor 108 will create expected response grammars from the cleaned lyrics. If the lyric source is not trusted, or if the lyrics text is not likely to fully match the words in the audio signal, the grammar processor 108 may create a stochastic grammar. To create stochastic grammar, the grammar processor 108 may place all the lines of lyrics in parallel and allow any arbitrary sequence of lyric lines to be recognized. The grammar processor 108 may insert optional and multiple words modeling instrumentals between words and at a beginning and an end of the grammar. In addition, filler word models may be used to model occurrences of non-words (vocalizations, etc.). Thus, in examples of untrusted lyric sources, grammars can be defined in a manner that allows for branching (e.g., any line of lyrics can follow any other line).

The audio engine 102 may analyze the suppressed audio signal by extracting feature vectors about every 10 ms (e.g., using Mel Frequency Cepstral Coefficients or (MFCC)). The ASR decoder 104 may then map the sequence of feature vectors to the expected response defined in the grammar. The ASR decoder 104 will expand the word grammar created by the grammar processor 108 into a phonetic grammar by using the dictionary database 110 to expand words into phonemes. The ASR decoder 104 may use a Hidden Markov Model (HMM) database 112 that statistically describes each phoneme in the features space (e.g., using MFCC) to obtain an optimal sequence of words from the phonemes that matches the grammar of the audio signal and corresponding feature vector. Although the HMM database 112 is illustrated separate from the system 100, in other examples, the HMM database 112 may be a component of the system 100 or may be contained within components of the system 100.

HMMs are typically trained on a large set of relevant data; in the context of lyric synchronization that could be a large set of songs. Estimation of model parameters can be performed using the Baum-Welch algorithm, for example. Parameters of the model can be determined by re-estimation given a set of training examples corresponding to a particular model, for example.

The ASR decoder 104 may use an HMM from the database 112 to decode the audio signal using a Viterbi decoding algorithm that determines an optimal sequence of text given the audio signal, expected grammar, and a set of HMMs that are trained on a large set of data, for example. Thus, the ASR decoder 104 uses the HMM database 112 of phonemes to map spoken words to a phonetic description, and uses the dictionary database 110 to map words to the phonetic description, for example.

The ASR decoder 104 will perform speech recognition or force alignment on the audio signal to create a sequence of word and phonetic transcriptions corresponding to speech in the audio signal.

When performing lyric synchronization, the ASR decoder 104 will also perform a timing analysis of the phonetic description. In one example, a set of input lyrics text and corresponding phonetic transcriptions are as shown below in Table 1.

TABLE 1

| Lyric Line | Input Lyrics Text (words and corresponding phonetic transcription) |
|---|---|
| 1 | Would You Believe Your Eyes<br>W UH D . Y UW . B IH L IY V . Y AO R . AY Z |
| 2 | As I Fell Asleep If Fireflies<br>AE Z . AY . F EH L . AH S L IY P . IH F . F AY ER F L AY Z |
| 3 | Produce Light For The World<br>PROH DOOCE . L AY T . F OUR . DH AH . W ER L D |

The phonetic transcription may be a standard dictionary transcription, such that, for example, the word "asleep" may be phonetically transcribed as "AH SH L IY P", and periods and spaces are used for clarity to indicate beginning/end of word transcriptions, to indicate pauses in the speech, or to indicate background instrumentals that may be heard between words. Note that for simplicity purposes, only a first three (out of N total) lines of the lyrics text are displayed in Table 1.

After performing speech recognition, the audio signal may be matched to the input lyrics, so as to generate output lyrics as shown below in Table 2.

TABLE 2

| Lyric Line | Start Time [sec] | Output lyrics text (words and corresponding phonetic transcription) | End Time [sec] |
|---|---|---|---|
| 1 | 22 | Would You Believe Your Eyes<br>W UH D . Y UW . B IH L IY V . Y AO R . AY Z | 24.4 |
| 2 | 24.7 | As I Fell Asleep If Fireflies<br>AE Z . AY . F EH L . AH S L IY P . IH F . F AY ER F L AY Z | 27 |
| 3 | 27.4 | Produce Light For The World<br>PROH DOOCE . L AY T . F OUR . DH AH . W ER L D | 30.2 |

In addition, timing information may be output with the output lyrics, as shown Table 2. The timing information may indicate an elapsed amount of time from a beginning of a song from which the audio signal was obtained, or an elapsed amount of time from a beginning of the received audio signal to a beginning of the line of text (e.g., lyrics), and an elapsed amount of time from a beginning of the audio signal to an end of the line of lyrics. The timing information may alternatively (or additionally) include an amount of time elapsed during a line, a word, or a phoneme of the lyrics.

As shown in Table 2, a first line of the output lyrics may have a start time of 22 seconds and an end time of 24.4 seconds. The start and end times are an elapsed amount of time from a beginning of the audio signal, for example. A second line of output lyrics is shown in Table 2 to have a start and end time of 24.7 and 27 seconds, and a third line of output lyrics is shown in Table 2 to have a start and end time of 27.4 and 30.2 seconds.

To determine the timing information, the ASR decoder 104 identifies an elapsed amount of time from a beginning of the audio signal to a time when vocals of the audio signal begin when the audio signal is played in a forward direction. Note that in the above example, timing information is specified at the line level, so the first line starts at 22 seconds and ends at 24.4 seconds. However, timing information may also be provided at a word level as well.

The ASR decoder 104 may determine timing information as a by-product of performing speech recognition. For example, a Viterbi decoder determines an optimal path through a matrix in which a vertical dimension represents HMI states and a horizontal dimension represents frames of speech (e.g., 10 ms). When an optimal sequence of HMM states is determined, an optimal sequence of corresponding phonemes and words is available. Because each pass through the HMM state consumes a frame of speech, the timing information at the state/phoneme/word level is available as the output of the automated speech recognition.

Alternatively, the ASR decoder 104 may include, have access to, or be operated according to a timer to determining the timing information, for example.

The system 100 in FIG. 1 may perform time-synchronization of lyrics and audio in a batch mode (i.e., not in real-time but instead by using a recording of the audio signal stored in file) so as to create the timing information as shown in Table 2 above for a number of audio signals or songs.

Components of the system 100 in FIG. 1 include engines, filters, processors, and decoders, any of which may include a computing device or a processor to execute functions of the components. Alternatively, any of the components of the system 100 in FIG. 1 may have functions embodied by computer software, which when executed by a computing device or processor cause the computing device or processor perform the functions of the components, for example. Thus, although not shown, the system 100 may include memory to store the computer software as well.

Figure 2:
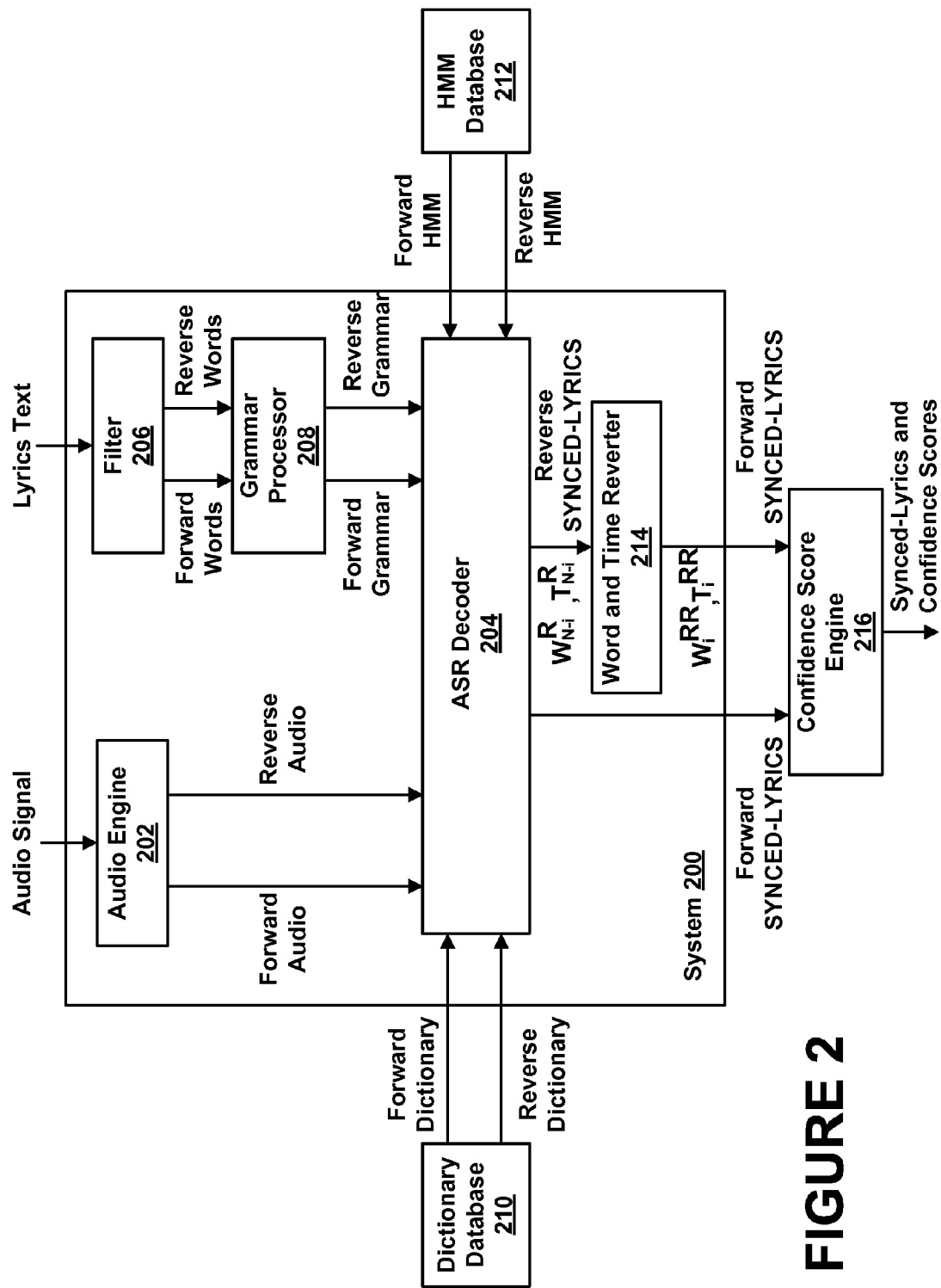
FIG. 2 shows an illustrative embodiment of another system for performing speech recognition and synchronizing text to the recognized speech.

FIG. 2 shows an illustrative embodiment of another system 200 for performing speech recognition and synchronizing text to the recognized speech. Many of the components of the system 200 are similar to components of the system 100, and may be embodied as computer hardware or software. For example, the system 200 includes an audio engine 202 that receives an audio signal, suppresses instrumentals of the audio signal, and outputs vocals of the audio signal. The audio engine 202 may output the vocals in a forward (direct) form and in a reverse form. The forward form is the vocals as spoken naturally in a forward direction, the reverse form is the vocals reversed in a backwards or opposite direction. To output the vocals in the reverse form, the audio engine 202 may playback the audio signal in an opposite direction, for example. The reverse form of the vocals may not be intelligible or understandable by a listener; however, the reverse form of the vocals can be used to further analyze the audio signal, for example. In one example, the audio engine 202 may use the Sox software from Sound eXchange to reverse input audio signals.

The system also includes an ASR decoder 204 to receive the forward and reverse audio signals from the audio engine 202, and to perform speech recognition and lyric synchronization of the audio signals.

A filter 206 receives lyrics text that corresponds to lyrics of the audio signal, and the filter 206 cleans and normalizes the lyrics text to output the text in a direct or forward direction and in a reverse or backwards direction. The forward words output from the filter 206 are the words of the lyrics written from left to right in a standard forward direction (as words as written in this disclosure). The reverse words output from the filter 206 are the words of the lyrics written/read from right to left in a backwards direction, and thus, only the order of the words may be reversed, for example.

A grammar processor 208 receives the words of the lyrics in the forward and reverse direction, and outputs "grammars" corresponding to words in the forward and reverse directions.

The ASR decoder 204 receives the forward and reverse grammars from the grammar processor 208, as well as forward and reverse dictionary word to phoneme mappings for the forward and reverse grammars from a dictionary database 210 to map words to phonetic transcriptions, for example. The ASR decoder 204 further receives statistical models of forward and reverse phonemes (e.g., small units of speech or sound that distinguish one utterance from another) from an HMM database 212. Acoustic (HMM) models for the reverse path will be trained on a training set of songs that were reversed, for example. Either or both of the dictionary database 210 and the HMM database 212 may be components of the system 200, or may be contained within components of the system 200, in other examples.

The ASR decoder 204 may perform mapping or synchronization of the audio signal to the lyrics text in the forward direction and in the reverse direction, for example. When performing the synchronization, the ASR decoder 204 may further output timing information as described above. Example methods of the forward synchronization are described above with reference to Tables 1 and 2.

To perform a reverse synchronization, the ASR decoder 204 uses the reverse audio, reverse grammar, reverse phonetic dictionary (e.g., the word "asleep" is phonetically transcribed as 'P IY L SH AH' in the reverse phonetic dictionary), and reverse HMMs (e.g., each phoneme will be trained on reversed audio data, and thus, a model for phoneme 'ah' in forward and reverse HMM set would be different). Table 3 below illustrates reverse input lyrics and reverse phonetic transcriptions of the lyrics in Table 1.

TABLE 3

| Lyric Line | Reverse Input Lyrics Text (words and corresponding phonetic transcription) |
| --- | --- |
| N-2 | World The For Light Produce<br>D L RE W . HA HD . RUO F . T YA L . ECOOD HORP |
| N-1 | Fireflies If Asleep Fell I As<br>Z YA L F RE YA F . F HI . P YI L S HA . L HE F. YA. Z EA |
| N | Eyes Your Believe You Would<br>Z YA. R OA Y . V YIL HIB . WUY . D HU W |

The reverse input lyrics shown in Table 3 are the reverse input lyrics of Table 1. As shown Table 3, a first line of the audio signal is the last line of the audio signal in Table 1. Thus, the lines of the lyrics are in reverse order, and also, the words in the lines are in reverse order (e.g., reversed from the order in Table 1). Further, the corresponding phonetic transcription of lyrics, mapped via the reverse dictionary database 10, are also in reverse order (e.g., read from right to left in reverse order). Note that for simplicity only the last 3 lines of lyrics (out of N total) are displayed in the example.

Figure 3:
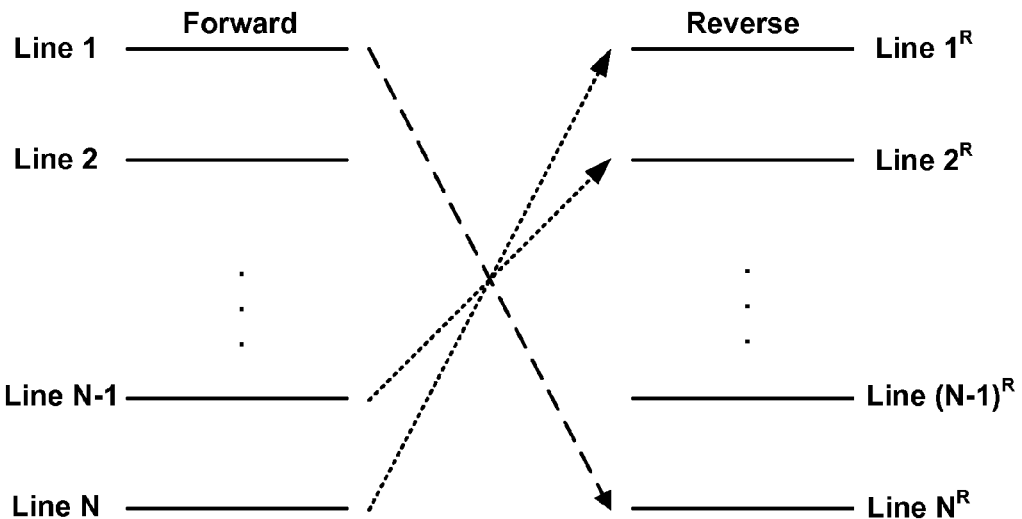
FIG. 3 illustrates a conceptual diagram showing the reversing of the input lyrics.

FIG. 3 illustrates a conceptual diagram showing the reversing of the input lyrics. As shown, for the reverse lyrics, Line N in the forward direction becomes a first line in the reverse direction (Line $1^R$), Line N-1 in the forward direction becomes a second line in the reverse direction (Line $2^R$), and so forth until Line 1 in the forward direction becomes a the last line in the reverse direction (Line $N^R$), for example.

Table 4a below indicates output lyrics with corresponding output timing information. In the same manner as described above for the forward direction, timing information may be output with the output lyrics in the reverse direction that may indicate an elapsed amount of time from a beginning of the received reversed audio signal. The timing information may be output as an elapsed amount of time from a beginning of the audio signal to a beginning of the line of lyrics (line start time and an elapsed amount of time from a beginning of the audio signal to an end of the line of lyrics (line end time).

As shown in Table 4a, a first line of the reverse output lyrics may have a start time of 197.8 seconds and an end time of 200.6 seconds. The start and end times are an elapsed amount of time from a beginning of the reversed audio signal, for example. A second line of reverse output lyrics is shown in Table 4a to have a start and end time of 202.5 and 203.3 seconds, and a third line of reverse output lyrics is shown in Table 4a to have a start and end time of 203.6 and 206 seconds.

To determine the timing information, the ASR decoder 204 identifies an elapsed amount of time from a beginning of the reverse audio signal to a time when vocals of the reverse audio signal begin when the audio signal is played in a reverse direction. Note that in the above example, timing information is specified at the line level, so the line N-2 starts at 197.8 seconds and ends at 200.6 seconds. However, timing information may also be provided at a word level as well.

TABLE 4a

| Lyric Line | Start [sec] | Output lyrics text (words and corresponding phonetic transcription) | End Time [sec] |
| --- | --- | --- | --- |
| N-2 | 197.8 | World The For Light Produce<br>D L RE W . HA HD . RUO F . T YA L . ECOOD HORP | 200.6 |

TABLE 4a-continued

| Lyric Line | Start [sec] | Output lyrics text (words and corresponding phonetic transcription) | End Time [sec] |
|---|---|---|---|
| N-1 | 202.5 | Fireflies If Asleep Fell I As<br>Z YA L F RE YA F . F HI . P YI L S HA .<br>L HE F. YA. Z EA | 203.3 |
| N | 203.6 | Eyes Your Believe You Would<br>Z YA. R OA Y . V YIL HIB . WUY . D HU W | 206 |

The ASR decoder 204 outputs the reverse output lyrics to a word and time reverter 214. The outputs of the reverse lyrics are $W_{N-i}^R$ that indicates the reversed lines/words and $T_{N-i}^R$ that indicates the corresponding mapped timing of the lines/words. The word and time reverter 214 will reverse or put the lines/words from the reverse output back to a forward direction according to Equation (1) below.

$$W_i^{RR} = W_{N-i}^R, i=1:N \quad \text{Equation (1)}$$

The output of the word and time reverter 214 is $W_i^{RR}$ which indicates reversed output text of the reverse alignment.

The timing information for start of a (or word), i, can be computed as:

$$T_i^{RR} = T_{total} - T_{N-i}^R \quad \text{Equation (2)}$$

where $T_{total}$ is a duration of the song or audio signal and $T_i^R$ is an end time of the line i in reversed synchronized lyrics.

In the example described herein, a total duration of the song, $T_{total}$, is 228 seconds. Table 4b below shows example data as the output of the word and time reverter 214.

TABLE 4b

| Lyric Line | Start Time [sec] | Output lyrics text (words and corresponding phonetic transcription) | End Time [sec] |
|---|---|---|---|
| 1 | 22 | Would You Believe Your Eyes<br>W UH D . Y UW . B IH L IY V . Y AO R . AY Z | 24.4 |
| 2 | 24.7 | As I Fell Asleep If Fireflies<br>AE Z . AY . F EH L . AH S L IY P . IH F .<br>F AY ER F L AY Z | 25.5 |
| 3 | 27.4 | Produce Light For The World<br>PROH DOOCE . L AY T . F OUR . DH AH .<br>W ER L D | 30.2 |

The ASR decoder 204 may output the forward synchronized lyrics and corresponding timing information, and the "reversed" reverse synchronized lyrics and timing information to a confidence score engine 216. The confidence score engine 216 computes confidence flags or scores for the timing information using a mismatch between the forward and reverse alignment.

To determine a mismatch between the forward and reverse alignment, the confidence score engine 216 compares a difference between the forward and reverse timing information to a predefined threshold, and marks the line as a low or high confidence line in accordance with the comparison. Line timing information may be defined as $T_n^{BP}$ where n is the line index, B defines a boundary type (S for start time, E end time) and P defines pass type (F for forward, R for reverse), then a start mismatch for line n is defined as:

$$MM_n^S = abs(T_n^{SF} - T_n^{SR}) \quad \text{Equation (3)}$$

and an end mismatch for line n is defined as:

$$MM_n^E = abs(T_n^{EF} - T_n^{ER}) \quad \text{Equation (4)}$$

The mismatch metrics can then be compared to a predefined threshold to determine if the line should be flagged as a low or high confidence line.

Figure 4:
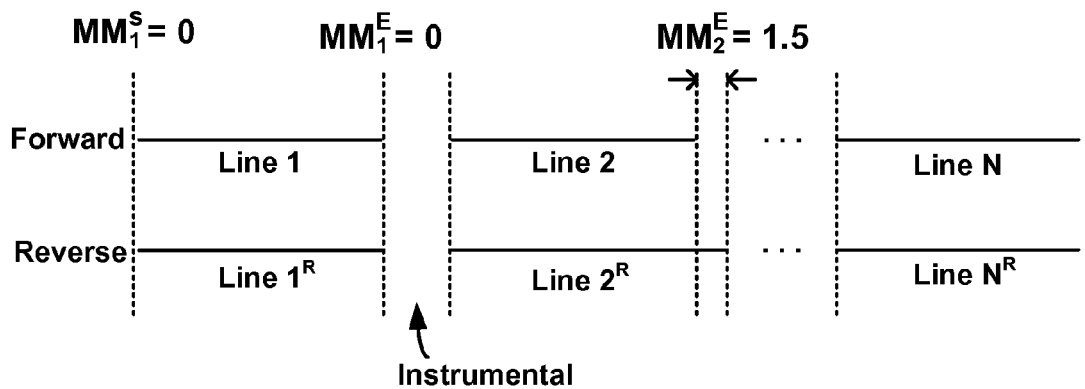
FIG. 4 is a conceptual illustration of an example of determining mismatches between forward and reverse alignments.

FIG. 4 is a conceptual illustration of an example of determining mismatches between the forward and reverse alignments. Using the above example, start and end mismatch metrics would have values of zero for line boundaries of the first and last lines. The start mismatch metric for the second line would have a value of zero, however, the end mismatch metric would have a value of 1.5 seconds ($MM_n^E = abs(T_n^{EF} - T_n^{ER})$, $T_2^{EF} = 27$, $T_2^{ER} = 25.5$, and $MM_2^E = abs(27-25.5) = 1.5$). The value of $MM_2^E$ would be compared to a threshold value, and if 1.5 seconds exceeds the threshold value, then the second line of the lyrics would be flagged as a low confidence line. The second line of the forward and/or reversed aligned lyrics could be flagged.

The threshold value may be any value, for example such as about one second, and may depend to some extent on a type of the audio signal. For example, the threshold may be dynamic, such that for faster songs where lines of lyrics may be shorter in length, the threshold may be decreased. The threshold for the confidence flag may be determined using techniques that minimize classification errors based on an example training set. For example, a number of false positives and or false negatives (i.e., where a line has correct boundaries but has been marked with low confidence, or has incorrect boundaries and has been marked with a high confidence) may be used as a training set.

In addition, a cost function may used be when determining the threshold to minimize errors that may be more relevant for a specific application, for example, to minimize a number of bad boundaries that are flagged as good (in a case where accuracy is desired) or to minimize a number of good boundaries that are flagged as bad (in a case where minimizing additional processing cost is desired).

The above example uses lines of lyrics, however, the mismatch metrics may also be used at any granularity level of content, such as words or phonemes.

The confidence score engine 216 may also analyze forward (or reverse) recognition results and determine a probability metric of line duration given a distribution of durations of all lines in the song or audio signal. This metric leverages the symmetric notion of modern western songs and computes a probability that a duration of a specific line fits a line duration model for a song or audio signal, for example. Given the duration of each line as determined in the automated alignment process (e.g., taken from the forward and/or reverse alignment), a parametric model of line duration can be estimated by calculating a mean and standard deviation of line duration. Then, for each line, if a distance from the mean duration is larger than a threshold, e.g., two standard deviations, the line is flagged as a low-confidence line. A value of the threshold may differ, and may be dynamic, based on an application or desired level of accuracy of the timing boundary information, for example.

Table 5 below illustrates computing line duration, mean, and standard deviation using the examples above in Tables 1-2 for the forward alignment. In the example in Table 5, a line is marked as a low confidence line if the distance to the mean (or difference between the line duration and the mean) is greater than one standard deviation.

TABLE 5

| | Forward Time Duration | Distance to mean | Confidence | Mean | Standard Deviation |
|---|---|---|---|---|---|
| Line 1 | 2.4 | 0.1 | High | 2.5 | 0.216 |
| Line 2 | 2.3 | 0.2 | High | | |
| Line 3 | 2.8 | 0.3 | Low | | |

A confidence score may also be computed and output from the confidence score engine 216 on a word level, in addition to or rather than on a line level, for example.

In other embodiments, the confidence score engine 216 may create a model of a line duration, and estimate a probability that the line is an outlier from the model based on a comparison of line durations. An outlier may indicate that the line was incorrectly processed during speech recognition, for example. The HMM models are generally not trained on the exact input audio signal, but rather are trained on training data. Thus, input audio signals may differ from those used to train the HMM models, which can result in errors during speech recognition or force-alignment.

Thus, methods are provided for computing confidence scores or metrics that include performing a comparison of alignment in forward and reverse directions, and performing line-duration confidence measures, for example.

Figure 5:
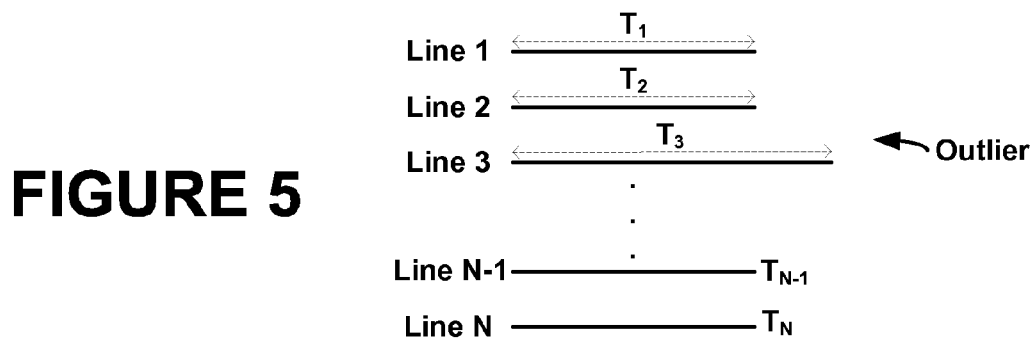
FIG. 5 is a conceptual illustration of an example of determining outliers of synchronized or mapped lines using either forward and reverse alignments.

FIG. 5 is a conceptual illustration of an example of determining outliers of synchronized or mapped lines using either the forward and reverse alignments. As shown, Lines 1, 2, N−1, and N each have substantially equal timing information. However, Line 3 has timing information $T_3$ (or length) that may differ by more than a threshold amount from the length of Line 1, $T_1$, or from the length of Line 2, $T_2$. Thus, Line 3 may be marked as an outlier using the line duration comparison.

In one example, estimation of line duration distribution may be constrained to lines of lyrics that belong to a same type of music segment (e.g., chorus only) as the line for which confidence is being estimated. For example, a song may be divided based on segments of the song (verse, chorus, bridge), and a value used for line duration, and thus, values of mean and standard deviation used to determine a confidence score, can be taken from a respective segment. For instance, when determining a confidence score of a line from the chorus, line durations values of lyrics corresponding to the chorus may be used.

The system 200 thus may output synchronized audio/lyrics in a forward and reverse direction, timing boundary information of words or lines of the lyrics in relation to the audio signal, and a confidence score/flag indicating how confident or reliable that the timing boundary information or content of the lyrics may be considered. The confidence score may be determined in a number of ways, for example, based on comparison of forward and reverse timing boundary information, using line duration comparisons, using comparisons of multiple alignments performed with multiple HMMs, etc. The system 200 may include or output the data to a database, and thus, the system 200 may process songs or audio signals in a batch mode to create a set of timed-annotated lyrics from a set of music and lyric files.

The system 200 may further use speech recognition techniques to map expected textual transcriptions of the audio signal to the audio signal. Alternatively, correct lyrics are received and are taken as the textual transcriptions of the vocal elements in the audio signal (so that speech recognition is not needed to determine the textual transcriptions), and a forced alignment of the lyrics can be performed to the audio signal to generate timing boundary information, for example.

Figure 6:
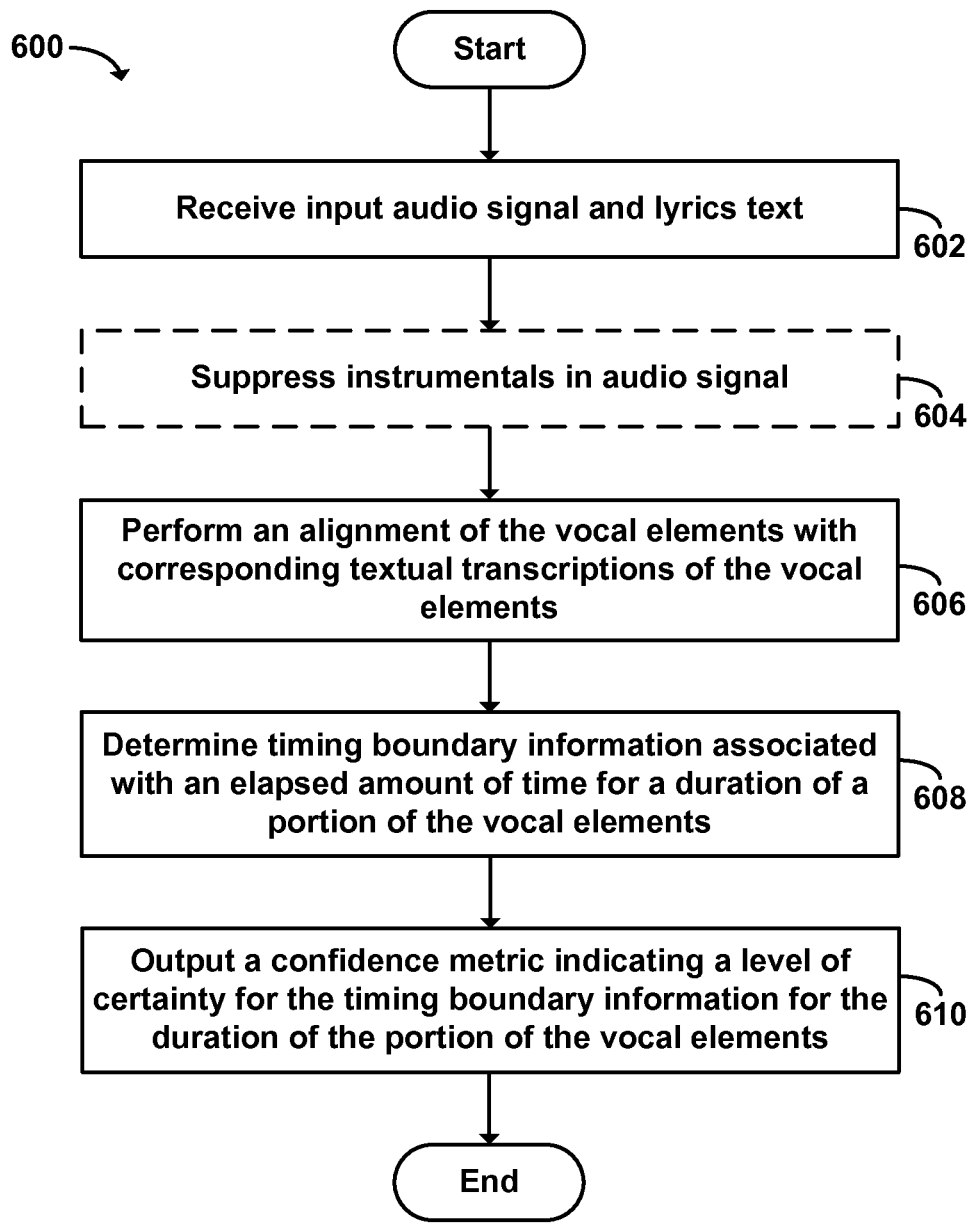
FIG. 6 shows a flowchart of an illustrative embodiment of a method for processing audio signals.

FIG. 6 shows a flowchart of an illustrative embodiment of a method 600 for processing audio signals. It should be understood that for this and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems, or other computer readable storage mediums.

In addition, each block in FIG. 6 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Initially in the method 600, an input audio signal and corresponding lyrics text are received, as block 602. The input audio signal may include both vocal elements and non-vocal elements, and may be a musical track or song, for example, or only a portion of a musical track or song. Following, as an optional step, instrumentals (or non-vocals) may be suppressed, as shown at block 604.

Then, an alignment of the vocal elements with the corresponding textual transcriptions of the vocal elements is performed, as shown at block 606. Timing boundary information can then be determined that is associated with an elapsed amount of time for a duration of a portion of the vocal elements, as shown at block 608.

A confidence metric may then be output that indicates a level of certainty for the timing boundary information for the duration of the portion of the vocal elements, as shown at block 610. The confidence metric may be determined in any number of ways, for example, such as by comparing line durations of the vocal elements to search for outliers, by comparing a forward and reverse alignment output, by comparing alignments performed in parallel or serial and using different HMMs. Other examples are possible as well.

Figure 7:
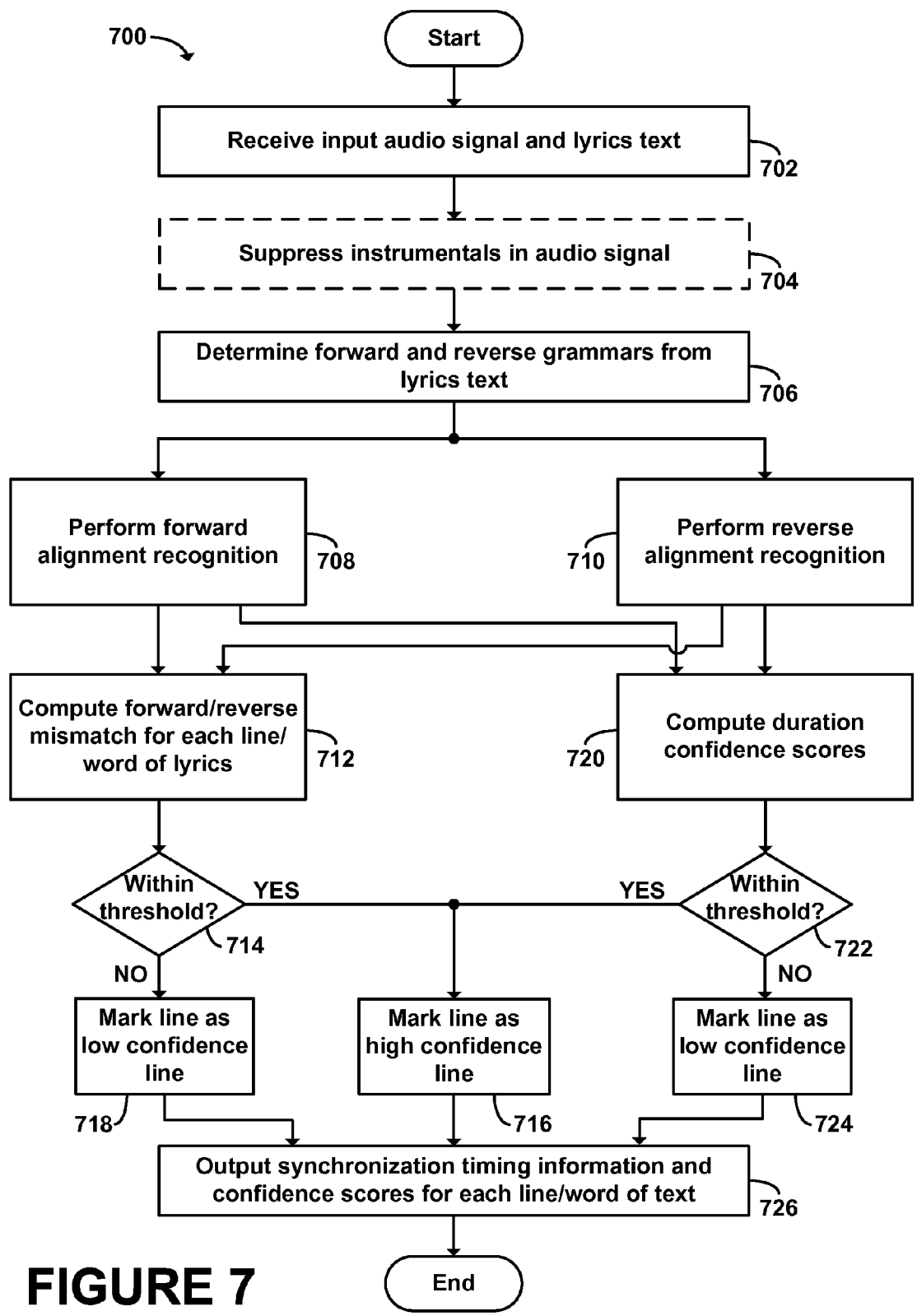
FIG. 7 shows a flowchart of another illustrative embodiment of a method for processing audio signals.

FIG. 7 shows a flowchart of another illustrative embodiment of a method 700 for processing audio signals. Initially in the method 700, an input audio signal and corresponding lyrics text are received, as block 702. The input audio signal may include both vocal elements and non-vocal elements, and may be a musical track or song, for example, or only a portion of a musical track or song. Following, as an optional step, instrumentals (or non-vocals) may be suppressed, as shown at block 704. Then forward and reverse grammars are determined from the lyrics text, as shown at block 706.

Next, a forward alignment of the grammars for the lyrics text processed in a forward direction with corresponding phonetic transcriptions of the vocal elements is performed, as shown at block 708. As part of the forward alignment, at the same time, or subsequently, a duration of a line, word, or phoneme of the grammars corresponding to the lyrics text is determined. The duration may indicate an elapsed amount of time from a beginning of the input audio signal to an end of the line of grammars, or an elapsed amount of time from a beginning of the line of grammars to the end of the line of grammars, for example.

In addition, a reverse alignment of the grammars for the lyrics text processed in a reverse direction with corresponding phonetic transcriptions of the vocal elements is performed, as shown at block 710. As part of the reverse alignment, at the same time, or subsequently, a duration of a line, word, or phoneme of the reverse grammars corresponding to the reverse lyrics text is determined. The forward and reverse alignment may be performed in parallel (at the same time or substantially same time) or in a serial manner, for example.

The forward and reverse line boundaries are then compared to compute mismatches for each line/word of the lyrics, at block 712. As one example, the start and end mismatch metrics described in Equations (2)-(3) are computed and compared to a threshold value.

Based on the comparison performed, a determination is made whether the metric is within a given threshold, at block 714. If the metric is within the threshold, the line of lyrics is marked as a high confidence line, at block 716. A high confidence line has a high reliability, certainty, or probability that the start and end time of the line highly or reliably corresponds to the vocal elements in the input audio signal. If the metric is not within the threshold, the line of lyrics is marked as a low confidence line, at block 718. A low confidence line has a low reliability, certainty, or probability that the line of grammars reliably corresponds to the vocal elements in the input audio signal.

As another example, at block 720, a probability metric of line duration can be computed and compared to a threshold (e.g., two standard deviations of line duration), at block 722. If the metric is within the threshold, the line of lyrics is marked as a high confidence line, at block 716. If the metric is not within the threshold, the line of lyrics is marked as a low confidence line, at block 724.

Following, audio synchronized with corresponding text, timing information, and/or confidence scores of each line of text are output, at block 726. The audio synchronized with corresponding text may also include time-annotations indicating a duration of a line of the text, for example. The confidence scores may indicate values of any one of the metrics described herein, or may include a high or low confidence value, for example.

The information output from the method 700 may be used in many different applications. Examples of such applications are described below.

In one example, in the system 100 of FIG. 1 or the system 200 of FIG. 2, Hidden Markov models are used for automated speech recognition, and the HMMs may be trained on a large corpus of data that aims to provide a good coverage of acoustic space, as well as generalization such that models work well on unseen speech.

Hidden Markov Models may be trained on a large set of training data with the goal that all variations of multiple speakers are captured. Such a type of HMM is referred to as speaker independent. Alternative HMMs can be obtained when models are trained on data that corresponds to a specific speaker, and such HMMs are referred to as speaker dependent systems. Speaker dependent systems may require that a large amount of training data for a specific speaker be collected for training purposes. However, instead of training speaker dependent models, adaptation techniques can be used. For example, using a small amount of data from the speaker, the HMM can be transformed to better fit characteristics of the speaker's voice. High-quality results can be achieved when using data with known transcriptions (e.g., supervised adaptation) and with a batch of data available for adaptation (e.g., static adaptation) opposed to incremental adaptation where models are adapted as more data is available. Linear transformations can be used to adapt the models, in which a set of transformations is computed using a Maximum Likelihood Linear Regression that reduces a mismatch between the adaptation data and an initial model set. Alternatively, a Maximum a Posteriori (MAP) technique can also be used to adapt HMMs, in which prior knowledge about model parameters distribution is used.

In an example embodiment, the methods of FIG. 6 or FIG. 7 may be performed in an iterative manner. The methods 600 or 700 may be performed in a first iteration, and lines (or words) of the speech or lyrics that have high-confidence scores can be selected and stored. The HMMs may then be adapted using the high-confidence data of the lines (or words) of the lyrics that have high-confidence scores using supervised adaptation techniques. For example, the methods 600 or 700 may be performed in a second iteration using the retrained HMM to attempt to acquire a larger number of high-confidence scores on the lines of lyrics. The HMMs may be retrained again with resulting high-confidence data, and an iterative synchronization process may continue by enhancing the HMMs via adaption using high-confidence lines output from the methods 600 or 700, for example.

Figure 8:
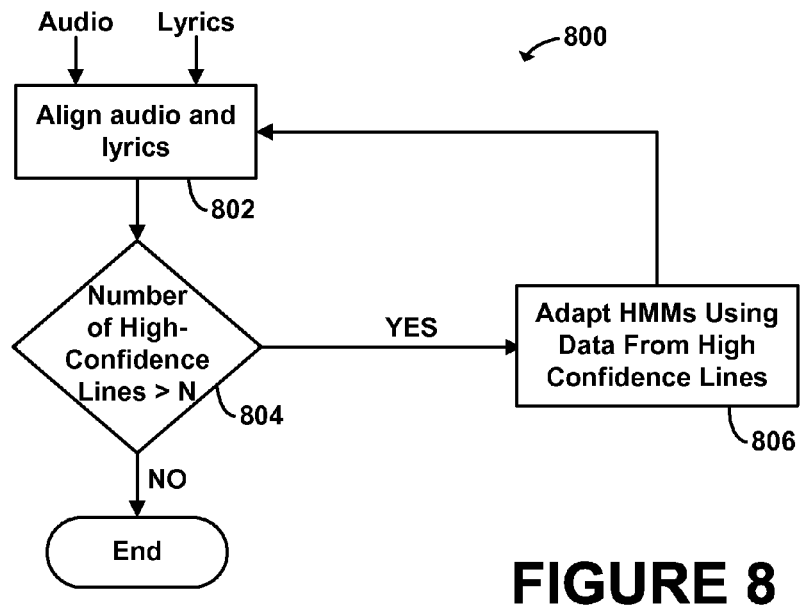
FIG. 8 shows a flowchart of an illustrative embodiment of a method for processing audio signals in an iterative manner.

FIG. 8 shows a flowchart of an illustrative embodiment of a method 800 for processing audio signals in an iterative manner. Initially, audio and lyrics are aligned using any of the methods described herein, at block 802. Time-annotated audio information is output as well as confidence scores or metric values indicating a number of high-confidence lines. Next, if the audio alignment process resulted in a number of high confidence lines greater than a threshold value, at block 804 (e.g., N which may be based on amount of data needed to perform supervised adaptation, e.g., more than 1 minute of audio data), then the HMMs are adapted and retrained using the data from the high confidence lines, at block 806. The audio and lyrics may then be realigned using the retrained HMMs, for example.

An output of the realignment process during the second iteration may be compared to an output of the alignment process of the first iteration, and if a number of high confidence lines in the second iteration is higher, the output of the second iteration may be stored as the time-annotated audio signal.

Figure 9:
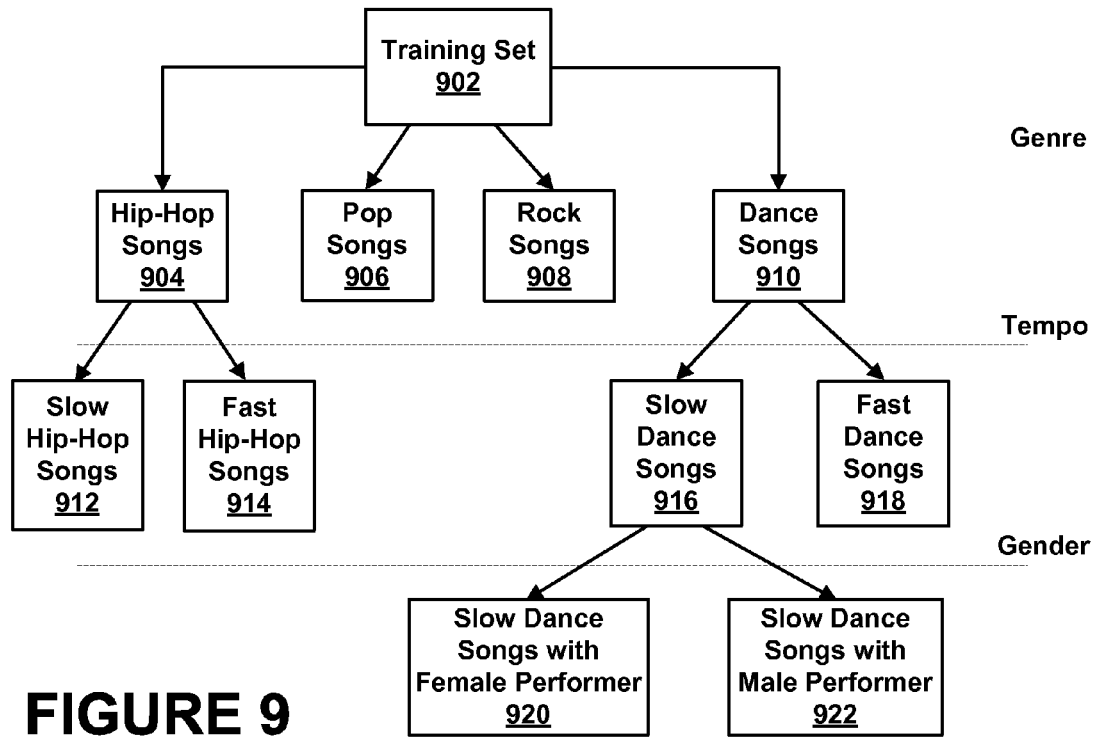
FIG. 9 is a block diagram illustrating a hierarchical HMM training and model selection.

In another example embodiment, methods described herein may be used to train data-specific HMMs to be used to recognize corresponding audio signals. For example, rather than using a general HMM for a given song, selection of a most appropriate model for a given song can be made. Multiple Hidden Markov models can be trained on subsets of training data using song metadata information (e.g., genre, singer, gender, tempo, etc.) as a selection criteria. FIG. 9 is a block diagram illustrating a hierarchical HMM training and model selection. An initial HMM training set 902 may be further adapted using genre information to generate separate models trained for a hip-hop genre 904, a pop genre 906, a rock genre 908, and a dance genre 910. The genre HMMs may be further adapted to a specific tempo, such as slow hip-hop songs 912, fast hip-hop songs 914, slow dance songs 916, and fast dance songs 918. Still further, these HMMs may be adapted based on a gender of a performer, such as a slow dance song with female performer 920 and slow dance song with male performer 922. Corresponding reverse models could also be trained using the training sets with reversed audio, for example.

A result of a one-time training process is a database of different Hidden Markov Models each of which may include metadata specifying a specific genre, tempo, gender of the trained data, for example.

Figure 10:
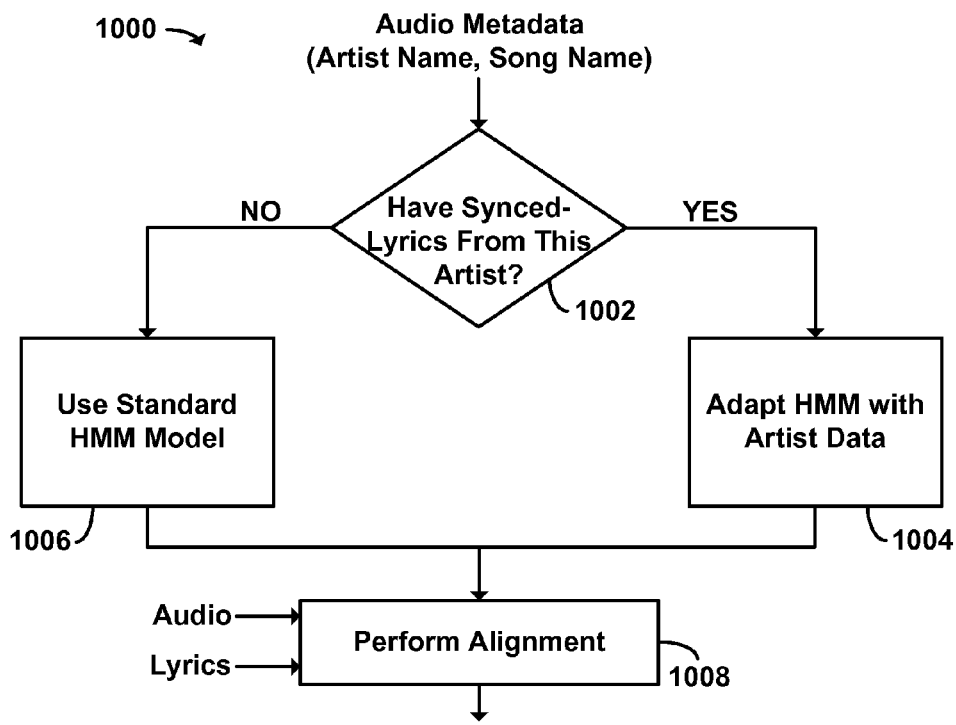
FIG. 10 shows a flowchart of an illustrative embodiment of a method for adapting HMM using existing synchronized-lyrics data from a specific performer.

Still further, in another example, FIG. 10 shows a flowchart of an illustrative embodiment of a method 1000 for adapting HMMs using existing synchronized-lyrics data from a specific performer. An input audio signal may include information (e.g., metadata) indicating a name of the song, a name of the artist of the song, etc. A system (such as system 100 or 200, for example) may search a database of synchronized lyrics to determine if there exists synchronized audio and lyrics for songs by the artist of the input audio signal, at block 1002. If there exists synchronized lyrics for a song or audio sample by the artist of the input signal, then an HMM model is retrained and adapted to the audio sample of the artist, at block 1004. If there are no synchronized lyrics for a song or audio sample by the artist of the input signal, then a standard HMM is used, at block 1006, and the audio and lyric alignment is performed at block 1008 with the appropriate HMM. Using the method of 1000, HMMs may be enhanced by using synchronized lyrics metadata from songs that have already been processed for a specific performer (e.g., singer). If such data already exists in the system, the data may be used to perform adaptation of the HMMs before synchronization process is performed. In this manner, a speaker independent HMM can be adapted to better model characteristics of a specific speaker.

In a specific example of an application of methods in FIGS. 8-10, an input audio sample of a particular song by The Beatles may be received along with corresponding lyrics text. If a system has performed audio-lyric synchronization of ten different songs for The Beatles, the system may first adapt a generic pop type-HMM using the previously audio-lyric synchronized data. The system may then use the adapted HMM for the audio-lyric synchronization process, for example.

In one embodiment, during any of the methods described herein, any of the data specific HMMs (e.g., as shown in FIG. 9 or enhanced as described in FIG. 10) may be used. In one example, a parallel audio and lyric synchronization process can be performed using each of the different HMMs. Using the resulting confidence information, a best result (e.g., result with a least number of low confidence lines) among all the different outputs can be selected as a final result.

Figure 11:
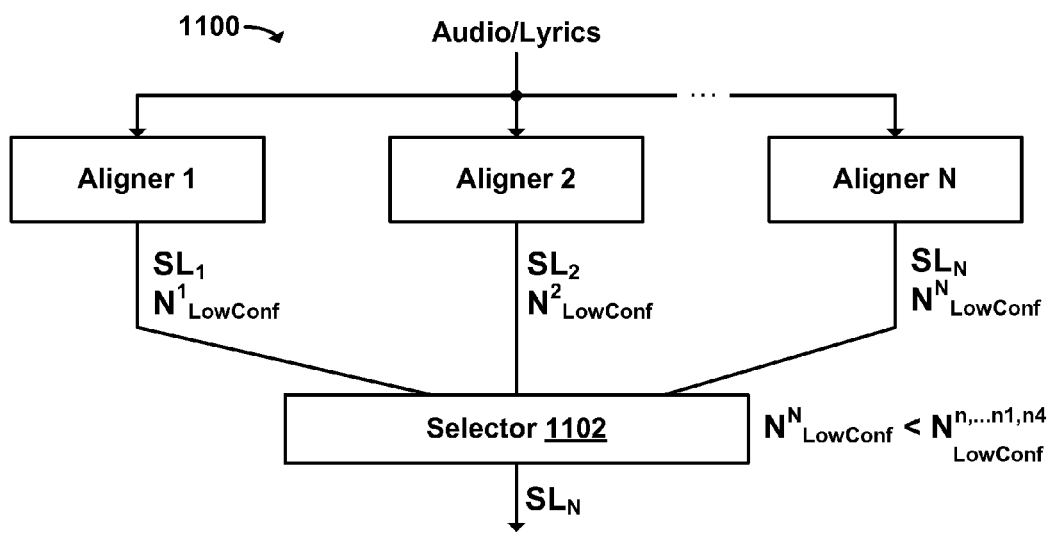
FIG. 11 is a block diagram illustrating an example parallel synchronization system.

FIG. 11 is a block diagram illustrating a parallel audio and lyric synchronization system 1100. The system 1100 includes a number of aligners (1, 2, . . . , N), each of which receives a copy of an input audio signal and corresponding lyrics text. The aligners operate to output time-annotated synchronized audio and lyrics, and may be or include any of the components as described above in system 100 of FIG. 1 or system 200 of FIG. 2. Each of the aligners may operate using different HMMs models (such as the different HMMs described in FIG. 9), and there may a number of aligners equal to a number of different possible HMMs.

Outputs of the aligners will include synchronized lyrics ($SL_1$, $SL_2$, . . . , $SL_N$), timing boundary information, and a corresponding confidence score ($N^1_{LowConf}$, $N^2_{LowConf}$, . . . , $N^N_{LowConf}$). The confidence score may be or include any of the metrics discussed above, and may also indicate a number of low confidence lines in the synchronized lyrics. A selector 1102 may receive the outputs of the aligners and select the output that has a best result, such as an output that has a lowest number of low confidence lines, for example.

Figure 12:
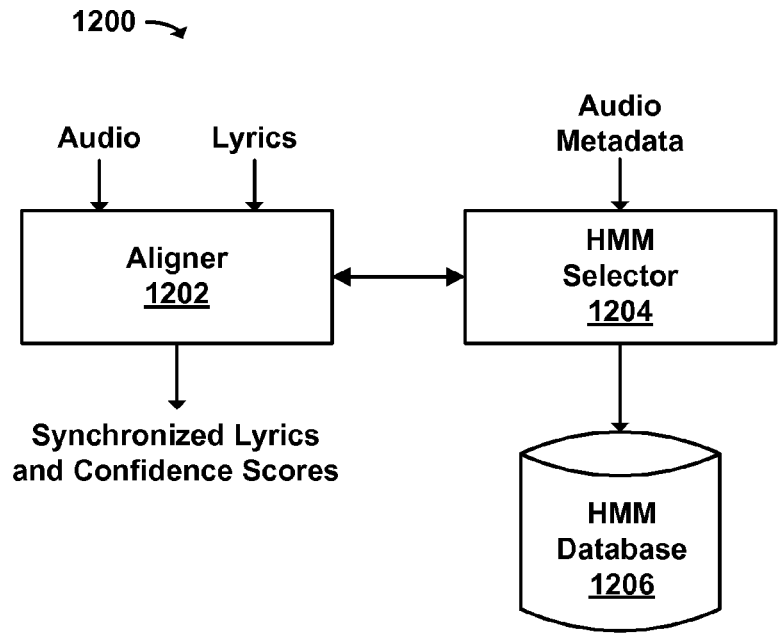
FIG. 12 is a block diagram of an example system for selecting an appropriate HMM.

In another example, a best HMM model may be selected based on criteria used to assign data to a training set, and the selected HMM model may be used to align the audio and lyrics. For example, an input audio signal may include metadata indicating a type of song, genre, tempo, performer's gender, etc., and such information may be used to select a specific HMM (as described in FIG. 9) to be used during speech recognition. FIG. 12 is a block diagram of an example system 1200 for selecting an appropriate HMM. An aligner 1202 may receive an input audio signal and lyrics text. The aligner 1202 may be or include any of the components of the system 100 in FIG. 1 or the system 200 in FIG. 2. The aligner 1202 may also receive a selected HMM from an HMM selector 1204. The HMM selector 1204 may also receive the input audio signal or may receive only metadata of the input audio signal (either from the aligner 1202 or independently) and can use the metadata information to select an appropriate HMM from an HMM database 1206. For example, if the audio signal that is being processed is a slow rock song, the metadata data may indicate such information and an HMM trained on slow rock songs would be selected and provided to the aligner to be used during speech recognition. To select an appropriate HMM, a back-off technique can be used in which a most specific model is sought first, and if such a model does not exist, a less specific model will be sought, etc. If no metadata about the song is known, or if no model matches the metadata, a generic HMM would be used for the synchronization.

Thus, using the examples shown in FIGS. 8-12, criteria can be defined to segment types of songs (e.g., genre), and HMM can be generated for specific type of song, and can subsequently be appropriately selected for using during speech recognition.

Figure 13:
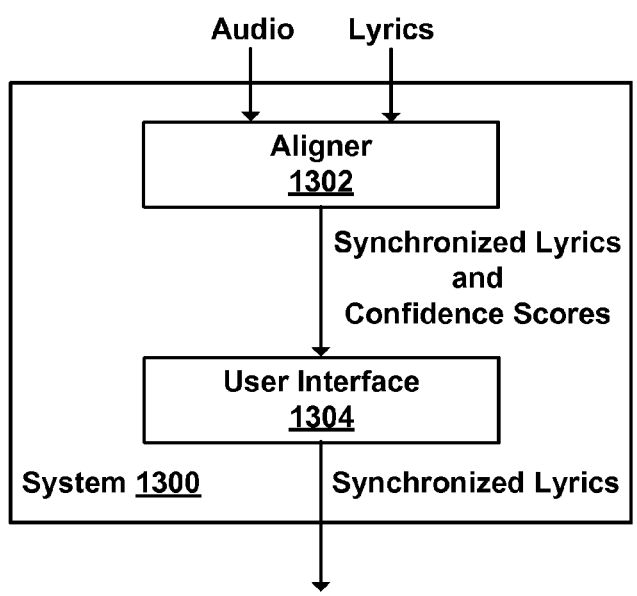
FIG. 13 is a block diagram of an example system for hybrid synchronization of audio and lyrics.

FIG. 13 is a system 1300 for hybrid synchronization of audio and lyrics. The system 1300 includes an aligner 1302, which may be or include any components of the system 100 in FIG. 1 or the system 200 in FIG. 2, to perform audio-lyric synchronization. The aligner 1302 outputs to a user interface 1304, which may enable a user to perform manual correction of lyrics that have errors in the lyrics text or timing information, for example. Thus, the system 1300 enables automated synchronization of audio and lyrics and provides for manual corrections to be made. In one embodiment, the aligner 1302 may output lines of the lyrics that have been marked with low confidence (or highlight low confidence lines) to the user interface 1304 for review or correction by a user, for example.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A method of processing audio signals, comprising:
  receiving an audio signal comprising vocal elements;
  a processor performing a forward alignment of the vocal elements in a forward direction with corresponding textual transcriptions of the vocal elements;
  based on the forward alignment, determining forward timing boundary information associated with an elapsed amount of time for a duration of a portion of the vocal elements processed in the forward direction;
  the processor performing a reverse alignment of the vocal elements processed in a reverse direction with corresponding reverse textual transcriptions of the vocal elements;

determining reverse timing boundary information associated with an elapsed amount of time for a duration of the portion of the vocal elements processed in the reverse direction;

processing the reverse alignment of the vocal elements and the reverse timing boundary information so as to provide the reverse alignment and the reverse timing boundary information in a forward direction and establish a second forward alignment of the vocal elements and a second forward timing boundary information; and based on a comparison between the forward timing boundary information and the second forward timing boundary information, outputting a confidence metric indicating a level of certainty for at least one of the forward timing boundary information and the second forward timing boundary information.

2. The method of claim 1, further comprising:

determining a difference between the forward timing boundary information and the reverse timing boundary information;

making a comparison of the difference to a predefined threshold; and based on the comparison, marking the portion of the vocal elements with a confidence level.

3. The method of claim 1, wherein the audio signal is a musical song, and wherein the portion of the vocal elements is a line of the musical song, and wherein the forward timing information and the reverse timing information each indicate a start and end time of the line of the musical song, and wherein the method further comprises comparing the forward timing information and the reverse timing information by:

comparing the start time of the forward timing information with the start time of the reverse timing information to provide a start mismatch metric; and comparing the end time of the forward timing information and the end time of the reverse timing information to provide an end mismatch metric.

4. The method of claim 1, further comprising:

for each of a plurality of portions of the vocal elements, determining timing boundary information;

computing a statistical model for a given duration of a portion of the vocal elements based on the plurality of portions of the vocal elements;

for each of a plurality of portions of the vocal elements, determining a probability that the duration fits the statistical model and comparing the probability to a threshold; and for portions of the vocal elements that that have a probability lower than the threshold, marking the portion of the vocal elements with a low-confidence flag.

5. The method of claim 1, further comprising:

for each of a plurality of portions of the vocal elements, determining timing boundary information;

comparing the timing boundary information of each of the plurality of portions of the vocal elements amongst each other; and based on the comparison, identifying outliers of the plurality of portions of the vocal elements.

6. The method of claim 1, wherein the audio signal comprises vocal elements and non-vocal elements, and the method further comprises suppressing the non-vocal elements.

7. The method of claim 1, wherein the audio signal is a song comprising lyrics, and wherein the method further comprises:

synchronizing the corresponding textual transcriptions of the vocal elements with the audio signal; and outputting time-annotated synchronized lyrics that indicate timing information of lines of the lyrics in relation to the audio signal.

8. The method of claim 1, wherein performing the forward alignment comprises performing speech recognition on the vocal elements using a Viterbi decoder and Hidden Markov Models (HMM), and wherein the audio signal is a musical track by an artist, and the method further comprises:

accessing a database for synchronized lyrics of the artist;

adapting the HMM using the synchronized lyrics of the artist as adaptation data to produce an updated HMM; and repeating the forward alignment using the updated HMM.

9. The method of claim 1, wherein the audio signal is a musical track, and wherein the portion of the vocal elements is selected from the group consisting of a line of lyrics of the musical tract and a word of lyrics of the musical track.

10. The method of claim 9, wherein outputting the confidence metric indicating a level of certainty for the forward timing boundary information for the duration of the portion of the vocal elements comprises marking the line of lyrics of the musical tract as a high or low confidence line.

11. The method of claim 1, further comprising:

performing speech recognition on the vocal elements to create a sequence of phonetic transcriptions; and performing an alignment of the vocal elements with the phonetic transcriptions.

12. The method of claim 11, wherein performing the alignment comprises:

receiving lyrics text corresponding to the audio signal;

determining grammars for the lyrics text; and mapping the phonetic description of the vocal elements to the grammars for the lyrics text.

13. The method of claim 1, wherein performing the forward alignment comprises performing speech recognition on a plurality of portions of the vocal elements using a Hidden Markov Model (HMM), and wherein the method further comprises:

making a determination whether the confidence metric exceeds a predetermined threshold; and adapting the HMM using data comprising portions of the vocal elements that have a confidence metric that does not exceed the predetermined threshold to produce an updated HMM; and repeating the forward alignment using the updated HMM.

14. The method of claim 13, further comprising repeating the steps of performing the forward alignment, outputting the confidence metric, adapting the HMM, and repeating the forward alignment in an iterative manner until there is no further decrease in a number of low-confidence lines.

15. The method of claim 1, wherein performing the forward alignment comprises performing speech recognition on the vocal elements using a Hidden Markov Model (HMM), and the method further comprises:

training a database of HMMs on training data based on metadata information of the audio signal; and selecting an HMM to perform the forward alignment based on metadata information of the audio signal.

16. The method of claim 15, wherein the metadata information indicates information selected from the group consisting of a genre, an artist, a gender, and a tempo.

17. The method of claim 1, further comprising performing the forward alignment a plurality of times using different Hidden Markov Model (HMM) for each alignment;

determining the forward timing boundary information for each respective alignment;

determining the confidence metric for each respective alignment;

selecting an alignment that has a confidence metric indicating a highest level of certainty for the timing boundary information; and outputting time-annotated synchronized lyrics that indicate forward timing boundary information corresponding to the selected alignment, wherein the forward timing boundary information pertains to lines of lyrics in relation to the audio signal.

18. A non-transitory computer readable storage medium having stored therein instructions executable by a computing device to cause the computing device to perform functions of:

receiving an audio signal comprising vocal elements;

performing a forward alignment of the vocal elements in a forward direction with corresponding textual transcriptions of the vocal elements;

based on the forward alignment, determining forward timing boundary information associated with an elapsed amount of time for a duration of a portion of the vocal elements processed in the forward direction;

the processor performing a reverse alignment of the vocal elements processed in a reverse direction with corresponding reverse textual transcriptions of the vocal elements;

determining reverse timing boundary information associated with an elapsed amount of time for a duration of the portion of the vocal elements processed in the reverse direction;

processing the reverse alignment of the vocal elements and the reverse timing boundary information so as to provide the reverse alignment and the reverse timing boundary information in a forward direction and establish a second forward alignment of the vocal elements and a second forward timing boundary information; and based on a comparison between the forward timing boundary information and the second forward timing boundary information, outputting a confidence metric indicating a level of certainty for at least one of the forward timing boundary information and the second forward timing boundary information.

19. The non-transitory computer readable storage medium of claim 18, wherein the instructions are further executable to perform functions of:

determining a difference between the forward timing boundary information and the reverse timing boundary information;

making a comparison of the difference to a predefined threshold; and based on the comparison, marking the portion of the vocal elements with a confidence level.

20. The non-transitory computer readable storage medium of claim 18, wherein the audio signal is a musical song, and wherein the portion of the vocal elements is a line of the musical song, and wherein the forward timing information and the reverse timing information each indicate a start and end time of the line of the musical song, and wherein the instructions are further executable to perform functions of comparing the forward timing information and the reverse timing information by:

comparing the start time of the forward timing information with the start time of the reverse timing information to provide a start mismatch metric; and comparing the end time of the forward timing information and the end time of the reverse timing information to provide an end mismatch metric.

21. The non-transitory computer readable storage medium of claim 18, wherein the instructions are further executable to perform functions of:

for each of a plurality of portions of the vocal elements, determining timing boundary information;

computing a mean value of the timing boundary information for the plurality of portions of the vocal elements;

for each of a plurality of portions of the vocal elements, determining whether the duration of the portion of the vocal elements differs from the mean value by more than a threshold; and for portions of the vocal elements that differ from the mean value by more than a threshold, marking the portion of the vocal elements with a low-confidence probability.

22. The non-transitory computer readable storage medium of claim 18, wherein the audio signal is a song comprising lyrics, and wherein the instructions are further executable to perform functions of:

synchronizing the corresponding textual transcriptions of the vocal elements with the audio signal; and outputting time-annotated synchronized lyrics that indicate timing information of lines of the lyrics in relation to the audio signal.

23. The non-transitory computer readable storage medium of claim 18, wherein the function of performing the forward alignment comprises performing speech recognition on the vocal elements using a Hidden Markov Model (HMM), and wherein the instructions are further executable to perform functions of:

selecting an HMM based on metadata information of the audio signal.

24. A system comprising:

a Hidden Markov Model (HMM) database that includes phonetic modeling of words;

a pronunciation dictionary database that includes grammars representing words; and a speech decoder configured to receive an audio signal and access the HMM to map vocal elements in the audio signal to phonetic descriptions and access the pronunciation dictionary database to map the phonetic descriptions to grammars, the speech decoder further configured to perform a forward alignment of the grammars with corresponding textual transcriptions of the vocal elements in a forward direction and a reverse alignment of the vocal elements processed in a reverse direction with corresponding reverse textual transcriptions of the vocal elements, wherein the speech decoder is configured to determine forward timing boundary information associated with an elapsed amount of time for a duration of a portion of the vocal elements processed in the forward direction and reverse timing boundary information associated with an elapsed amount of time for a duration of the portion of the vocal elements processed in the reverse direction, and the speech decoder is configured to process the reverse alignment of the vocal elements and the reverse timing boundary information so as to provide the reverse alignment and the reverse timing boundary information in a forward direction and establish a second forward alignment of the vocal elements and a second forward timing boundary information, and the speech decoder is configured to determine based on a comparison between the forward timing boundary information and the second forward timing boundary information a confidence metric indicating a level of certainty for at least one of the forward timing boundary information and the second forward timing boundary information for the duration of the portion of the vocal elements.

25. The system of claim 24, further comprising a grammar processor for receiving text corresponding to lyrics of the audio signal, and for determining grammars corresponding to the lyrics, wherein the speech decoder performs the alignment of the grammars with corresponding textual transcriptions of the vocal elements in both the forward direction and the reverse direction by aligning the grammars of the audio signal with the grammars of the lyrics.

26. The system of claim 24, wherein the speech decoder determines a difference between the forward timing information and the reverse timing information, and based on a comparison of the difference to a predefined threshold, the speech decoder marks the portion of the vocal elements with a confidence level.

27. The system of claim 24, wherein the speech decoder synchronizes textual transcriptions of the vocal elements with the audio signal, and outputs time-annotated synchronized lyrics that indicate timing boundary information of lines of lyrics in relation to the audio signal.

* * * * *